(12) United States Patent
Schillo et al.

(10) Patent No.: US 6,168,177 B1
(45) Date of Patent: Jan. 2, 2001

(54) WHEEL CAMBER ADAPTER FOR A WHEELCHAIR

(75) Inventors: Stefan Schillo, Sinsheim; Herman Boiten, Gottingen, both of (DE)

(73) Assignee: Otto Bock Orthopadische Industrie GmbH & Co.(DE)

( * ) Notice: Under 35 U.S.C. 154(b), the term of this patent shall be extended for 0 days.

(21) Appl. No.: 09/098,956

(22) Filed: Jun. 17, 1998

(30) Foreign Application Priority Data

Jun. 27, 1997 (DE) .......................................... 297 11 230 U

(51) Int. Cl.$^7$ ...................................................... B62M 1/14
(52) U.S. Cl. ..................... 280/250.1; 280/304.1; 280/86.751; 403/103
(58) Field of Search ..................... 403/256, 257, 403/374.1, 373, 374.2, 374.3, 87, 84, 103; 280/304.1, 250.1, 86.751

(56) References Cited

U.S. PATENT DOCUMENTS

| 3,574,437 | * | 4/1971 | Stein et al. | 312/341 |
|---|---|---|---|---|
| 4,761,092 | * | 8/1988 | Nakatani | 403/104 |
| 5,131,672 | * | 7/1992 | Robertson et al. | 280/250.1 |
| 5,333,894 | * | 8/1994 | Mayes | 280/250.1 |
| 5,590,893 | * | 1/1997 | Robinson et al. | 280/250.1 |
| 5,662,345 | * | 9/1997 | Kiewit | 280/250.1 |
| 5,851,018 | * | 12/1998 | Curran et al. | 280/250.1 |
| 5,884,928 | * | 3/1999 | Papac | 280/250.1 |

* cited by examiner

*Primary Examiner*—Paul N. Dickson
*Assistant Examiner*—Avraham H. Lerner
(74) *Attorney, Agent, or Firm*—McGuireWoods, LLP

(57) ABSTRACT

An arrangement for receiving and setting a wheel axle for a drive wheel of a wheelchair, with an adapter (1) for adjusting the wheel camber, characterized in that the adapter (1) has a receiving bore (2) for the wheel axle, extends longitudinally approximately in the direction of this bore (2) and, to set the camber, can be attached removably to the wheelchair frame (9) in the desired position and is able to slide crosswise to the wheelchair frame (9) on a path running in a segmental arch.

9 Claims, 5 Drawing Sheets

WHEEL CAMBER ADAPTER FOR A WHEELCHAIR

BACKGROUND OF THE INVENTION

1. Field of the Invention

The invention relates to an arrangement for receiving and setting a wheel axle for a drive wheel of a wheelchair, with an adapter for adjusting the wheel camber.

2. Background Description

In active wheelchairs and sports wheelchairs the drive wheels are usually equipped with a negative wheel camber which increases the wheelchair's maneuverability on the one hand but on the other hand also increases the wheelchair's overall width. In this connection, various wheel cambers are used in practical operation for various fields of application. In everyday use, for example, riding is with 0° or 2.5° wheel camber, and a wheel camber of up to 18° is used for tennis as an extreme type of sport.

These wishes are complied with by accordingly designed adapter pieces between the wheelchair frame and the drive wheel. All solution suggestions that have become known thus far are saddled with disadvantages.

Some adapter pieces allow only one camber setting or can only be converted to another camber setting at great expense. In practical operation, however, for example for a tennis player, this means that he no longer fits through a bathroom door with his wheelchair or cannot use his tennis wheelchair in everyday use.

In a solution suggestion that is somewhat better in this respect, pressing a pin releases the catching of a wheel adapter which is then pushed forward, rotated into the desired angle and pushed backward again. Subsequently, by pressing a second pin the axle of the drive wheel can be attached further inward or outward. This results in difficulties relocating the camber settings once puzzled out. There is a lot of play in the individual components and it is not possible to reset the wheel track.

Another suggestion provides that by releasing a clamping connection, an adapter piece can be removed whose two ends are laid out for different camber settings. So two different wheel cambers can be produced by changing the adapter. Only two settings are thereby possible in this case as well; the drive wheel must be removed in each case and a resetting of the wheel track is not possible.

SUMMARY OF THE INVENTION

The invention is based on the technical problem of improving the arrangement described in the beginning in such a way that several camber settings can be carried out with it, in connection with which it should be possible to change the camber without removing the drive wheel.

This technical problem is solved according to the invention in that the adapter has a receiving bore for the wheel axle, extends longitudinally approximately in the direction of this bore and, to set the camber, can be attached removably to the wheelchair frame in the desired position and is able to slide crosswise to the wheelchair frame on a path running in a segmental arch.

In this connection, it is useful if the adapter is provided with stops defining its two sliding end positions.

It is furthermore advantageous if, for track balancing, the adapter can be swung with its guides around an axis lying approximately horizontally and crosswise to the wheelchair frame and can be fixed in the desired position.

A compact construction for the track balancing is provided when, to develop the aforementioned ability to swing, the upper guide piece for the adapter engages, with a top with rounded-off cross-section, in a groove, adapted to the curve and running crosswise to the wheelchair frame, of an attachment arrangement for attaching the adapter to the wheelchair frame.

An arrangement having altogether few components is characterized according to the invention in that the attachment arrangement comprises an upper and a lower clamping shell displaying the aforementioned groove which are designed to wrap around in clamping manner a longitudinal tube of the wheelchair frame and can be tightened against each other by means of locking screws that can be screwed into the upper guide piece for the adapter.

With the arrangement according to the invention, several camber settings can thus be carried out without having to remove the assigned drive wheel when changing the camber. It is furthermore advantageous that in a design of the arrangement according to the invention, at the same time a track balancing can also be carried out which may be necessary due to the use of different sized steering wheels/steering wheel forks.

Further characteristics of the invention are the subject of the subclaims and are explained in greater detail with other advantages of the invention with the help of an example of execution.

BRIEF DESCRIPTION OF THE DRAWINGS

The drawings show a form of construction of the invention serving as an example.

DETAILED DESCRIPTION OF A PREFERRED EMBODIMENT OF THE INVENTION

Figure 1:
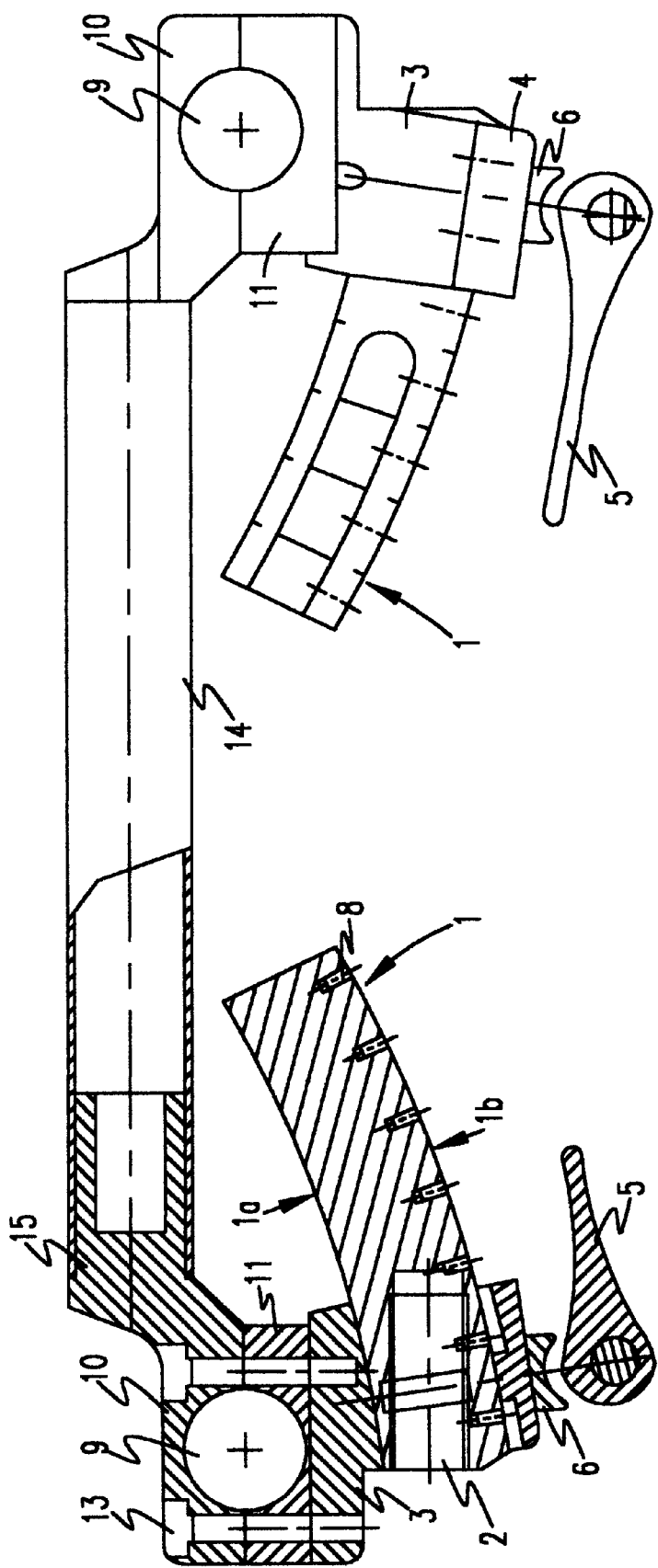
FIG. 1 shows a front view of an arrangement, clamped on the wheelchair frame on each of the two side walls of a wheelchair, for receiving a wheel axle for a drive wheel, whereby the arrangement shown on the left is illustrated cut and the arrangement mounted on the right side is illustrated in front view and both arrangements are illustrated for a wheel camber of 0°.
Figure 2:
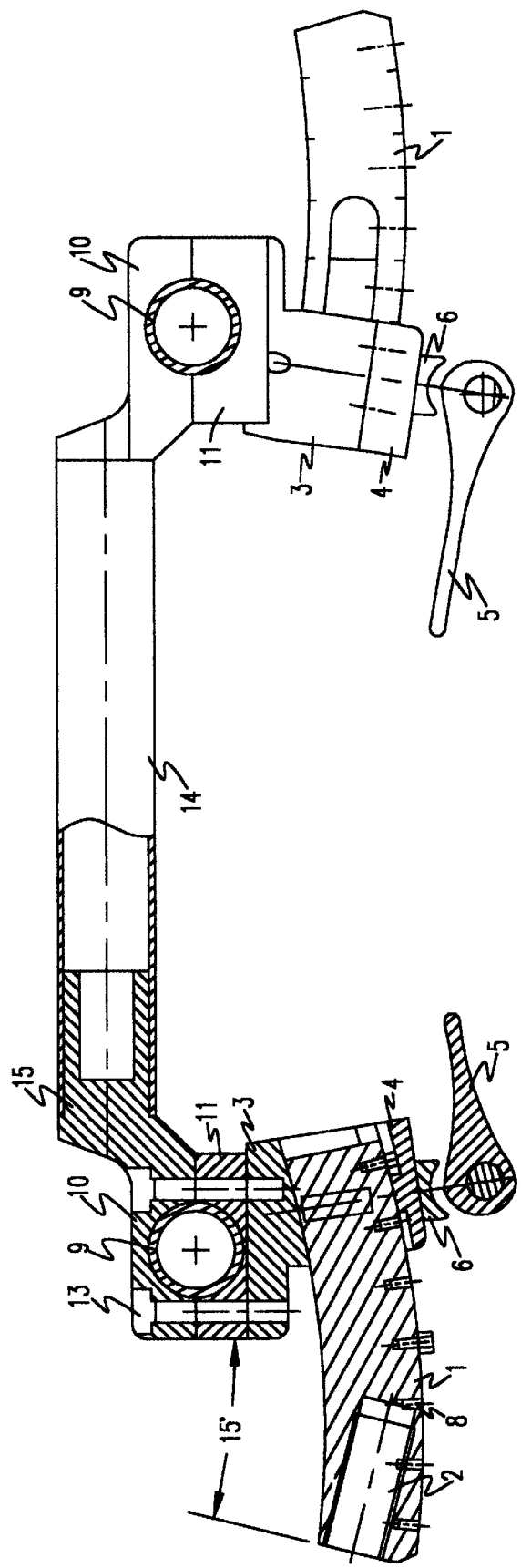
FIG. 2 is an illustration according to FIG. 1 with a wheel camber set at 15°.

According to FIG. 1, the arrangement shown on the left as well as on the right for receiving and setting a wheel axle for a drive wheel of a wheelchair consists of an oblong adapter somewhat curved in arch shape and having a receiving bore 2 for the wheel axle—not shown—of a drive wheel, not shown in greater detail either. The receiving bore 2 extends in the longitudinal direction of the adapter 1 which is guided sliding longitudinally on its upper side wall 1a in an upper guide piece 3 with U-shaped crosssection and with its lower side wall 1b in a lower guide piece 4 also designed with U-shaped cross-section.

For fixing the adapter 1 between the two guide pieces 3, 4, a quick-action gripping lever 5 is provided which, in its clamping position, impacts a base 6 fitting against the bottom of the lower guide piece 4.

Figure 3:
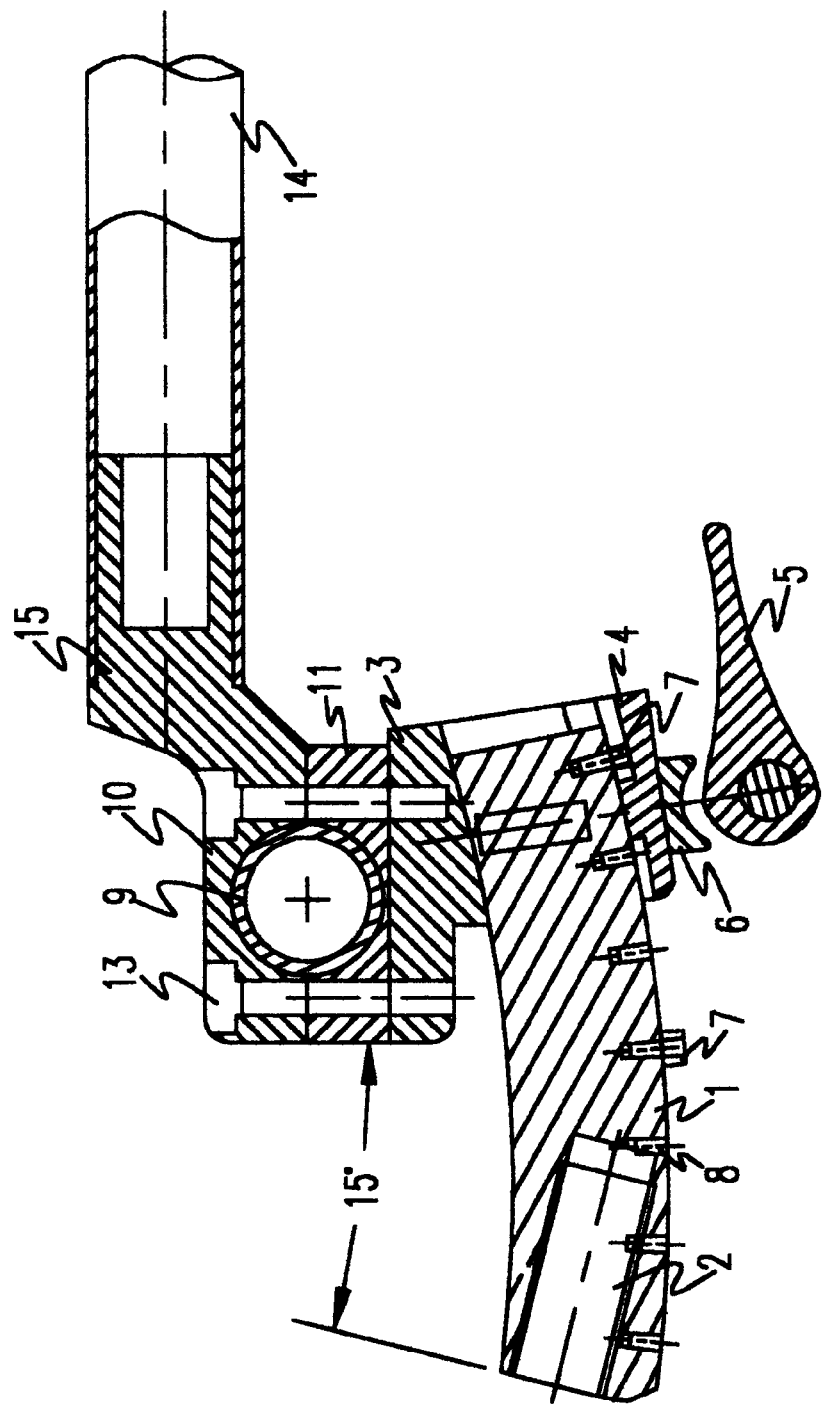
FIG. 3 is an enlargement of the left half of the illustration according to FIG. 2.

The adapter 1 is provided with two stops 7 defining its two sliding end positions which are formed by cap screws and can be optionally screwed into one of the seats 8 designed as threaded bores. Back of these seats 8 is assigned to a specific camber setting. FIG. 3 shows that the right stop 7 is dipped with its screw head into a corresponding recess of the lower guide piece 4 and fits against the mid-section of this guide piece 4. This stop defines a 15° wheel camber.

Figure 4:
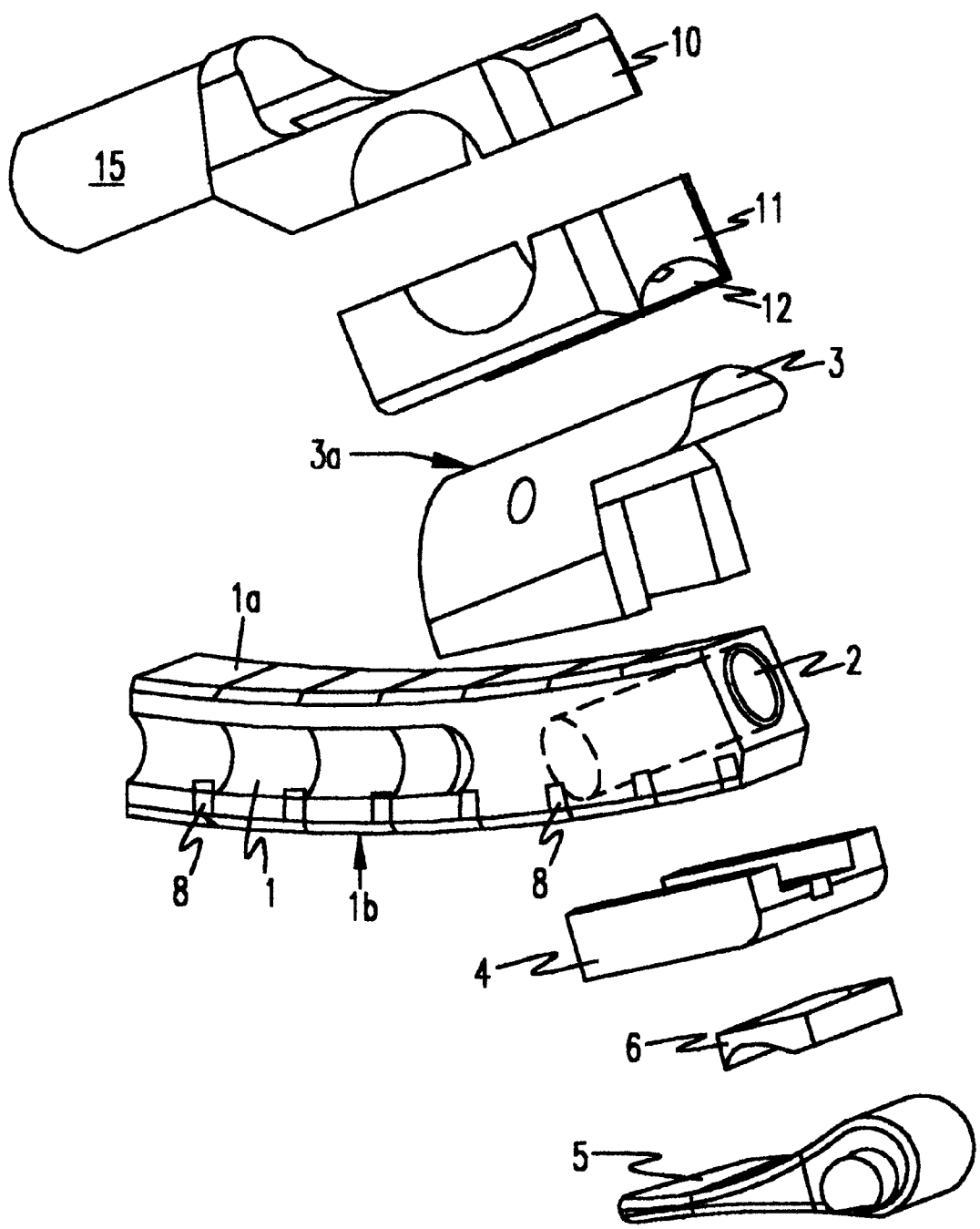
FIG. 4 shows the arrangement illustrated on the right in FIG. 1, in exploded view.

The adapter 1 is attached in clamping manner to a longitudinal tube of the wheelchair frame 9. This attachment system has an upper clamping shell 10 as well as a lower clamping shell 11 which together wrap the aforementioned longitudinal tube of the wheelchair frame 9. The lower clamping shell 11 is provided on its bottom with a groove 12 running crosswise to the wheelchair frame 9 and having a rounded-off groove floor (see FIG. 4) into which the top 3a, designed accordingly rounded-off, of the upper guide piece 3 engages in such a way that the upper guide piece 3 can be swung in relation to the attachment arrangement 10, 11 and around an axis running crosswise to the wheelchair frame 9. The two clamping shells 10, 11 can be swung against each other via locking screws 13 that are screwed into the upper guide piece 3.

The upper clamping shells 10 clamped to the two side walls of the wheelchair frame 9 are connected with each other via a cross-tube 14, whereby the other clamping shell 10 is pushed into the cross-tube 14 with a tappet 15.

Figure 5:
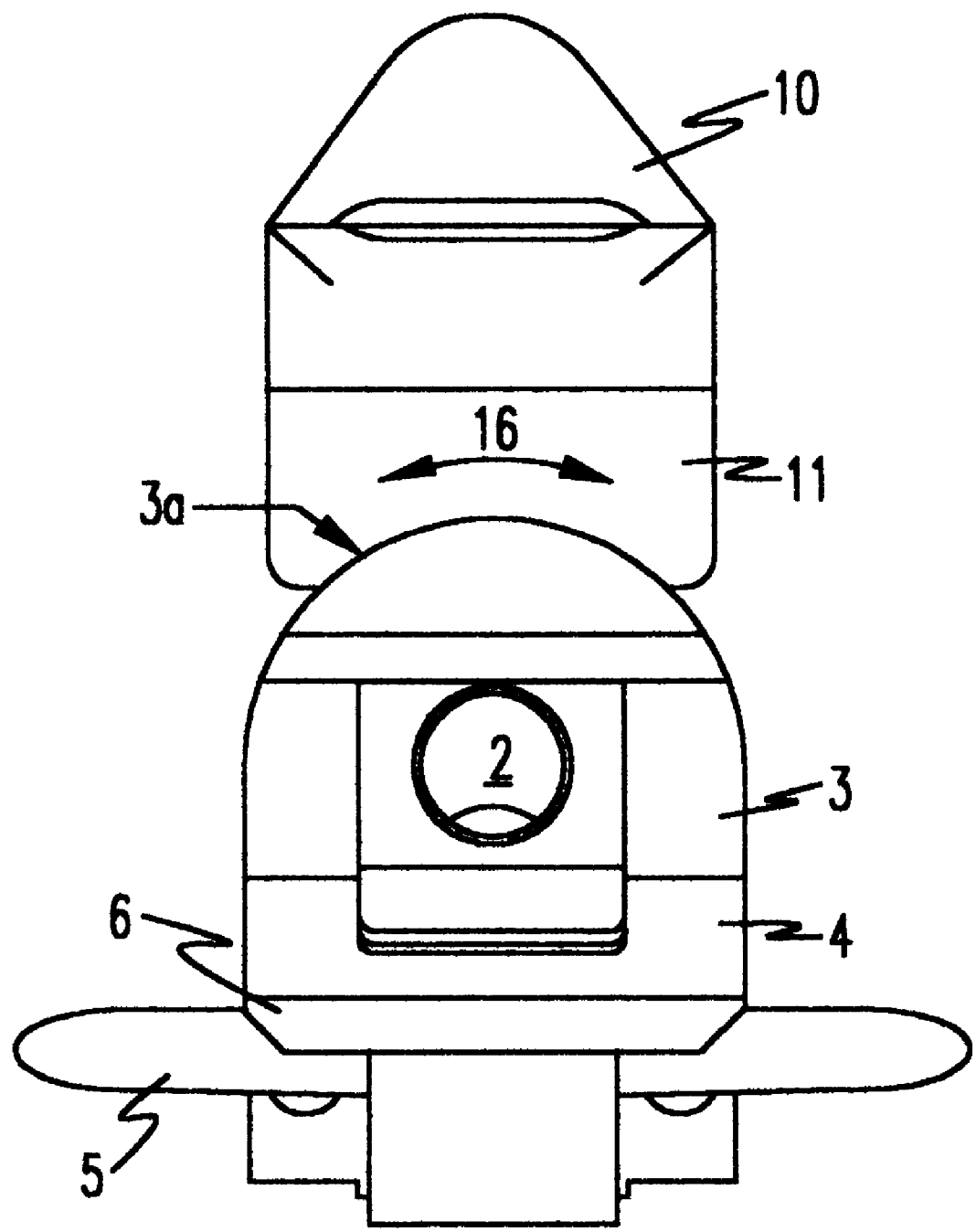
FIG. 5 shows the arrangement illustrated on the left in FIG. 2, in side view.

The arrangement according to the invention makes possible various camber settings without having to remove the drive wheel when changing the camber. Due to the adapter componentry's ability, indicated in FIG. 5 by the arrow 16, to swing in relation to the attachment arrangement 10, 11, 13, a track balancing is also possible which may be necessary due to the use of different sized steering wheels/steering wheel forks. Furthermore, by sliding the attachment arrangement 10, 11, 13 on the longitudinal tube of the wheelchair frame 9, it is possible to individually set the depth, that is, to adjust the center of gravity.

The minimum camber for the illustrated example of execution is 0° and can be adjusted in increments of 3°, for example, up to a maximum camber of 15°, for example.

What we claim is:

1. An arrangement on a wheelchair for adjusting the camber of a drive wheel of the wheelchair, the wheelchair comprising a wheelchair fram and the drive wheel comprising a wheel axle wherein the arrangement comprises an adapter attached to the wheelchair frame, the adapter extending longitudinally crosswise to the wheelchair frame and having a receiving bore for said wheel axle, the receiving bore extending in the longitudinal direction of the adapter, which is in its longitudinal direction slidable crosswise to the wheelchair frame on a path defining a segmental arch and is lockable in a position on said path defining the desired camber, wherein the adapter is an arch shaped oblong adapter having upper and lower side walls and is adjacent, with a longitudinal guide, to a sliding surface curved in a segmental arch and able to be connected with the wheelchair frame.

2. Arrangement according to claim 1, wherein the adapter is guided, on its upper and lower side walls, longitudinally sliding along said upper and lower side walls in a guide piece with a U-shaped cross-section.

3. Arrangement according to claim 1, wherein a quick-action gripping lever is provided for fixing the adapter in relation to the wheelchair frame.

4. An arrangement on a wheelchair for adjusting the camber of a drive wheel of the wheelchair, the wheelchair comprising a wheelchair frame and the drive wheel comprising a wheel axle wherein the arrangement comprises an adapter attached to the wheelchair frame, the adapter extending longitudinally crosswise to the wheelchair frame and having a receiving bore for said wheel axle, the receiving bore extending in the longitudinal direction of the adapter, which is in its longitudinal direction slidable crosswise to the wheelchair frame on a path defining a segmental arch and is lockable in a position on said path defining the desired camber, wherein the adapter is provided with stops, said stops placed longitudinally at a distance from each other and providing a limit to longitudinal displacement of the adapter, said stops further defining first and second sliding end positions, further comprising several seats, each assigned to a specific camber position, and provided for the stops, said seats each positioned at a specific longitudinal location along the adapter thereby indicating a specific camber position.

5. Arrangement according to claim 4, wherein the stops are formed by cap screws, which can be optionally screwed into two of the seats designed as threaded bores.

6. An arrangement on a wheelchair for adjusting the camber of a drive wheel of the wheelchair, the wheelchair comprising a wheelchair frame and the drive wheel comprising a wheel axle wherein the arrangement comprises an adapter attached to the wheelchair frame, the adapter extending longitudinally crosswise to the wheelchair frame and having a receiving bore for said wheel axle, the receiving bore extending in the longitudinal direction of the adapter, which is in its longitudinal direction slidable crosswise to the wheelchair frame on a path defining a segmental arch and is lockable in a position on said path defining the desired camber, wherein for track balancing, the arrangement further comprises an upper guide piece and a lower guide piece, said guide pieces providing between them a groove for receiving the adapter, the groove running crosswise in a longitudinal direction and crosswise to the wheelchair frame, wherein the adapter can be swung with its guide pieces around an axis lying approximately horizontally and crosswise to the wheelchair frame and can be fixed in the desired position.

7. Arrangement according to claim 6, wherein to develop the aforementioned ability to swing, the upper guide piece for the adapter has a rounded-off cross-section which fits in a groove attached to the wheelchair frame, the groove adapted to the curve of the upper guide piece and running crosswise to the wheelchair frame for attaching the adapter to the wheelchair frame in a horizontally slidable manner.

8. Arrangement according to claim 7, wherein the attachment arrangement comprises an upper and a lower clamping shell displaying the aforementioned groove said upper and lower clamping shell designed to wrap around in clamping manner a longitudinal tube of the wheelchair frame, wherein said upper and lower clamping shells can be tightened against each other by means of locking screws that can be screwed into the upper guide piece for the adapter.

9. Arrangement according to claim 8, further comprising first and second upper clamping shells wherein the upper clamping shells are able to be attached to two horizontally spaced side walls of the wheelchair frame, said upper clamping shells are connected with each other via a cross-tube and the first and second upper clamping shells can each be tightened against a first and second lower clamping shell.

\* \* \* \* \*

UNITED STATES PATENT AND TRADEMARK OFFICE
CERTIFICATE OF CORRECTION

PATENT NO.    : 6,168,177 B1
DATED         : January 2, 2001
INVENTOR(S)   : Schillo et al.

It is certified that error appears in the above-identified patent and that said Letters Patent is hereby corrected as shown below:

<u>Title page,</u>
Item [73], delete the assignee name "Otto Bock Orthopadische Industrie GmbH & Co.(DE)" and insert -- Otto Bock Orthopadische Industrie Besitz und Verwaltungs-Kommanditgesellschaft. --

Signed and Sealed this

Sixteenth Day of September, 2003

JAMES E. ROGAN
*Director of the United States Patent and Trademark Office*